Dec. 1, 1942.   R. B. BAKER   2,303,523
TIRE INTERLINER
Filed May 21, 1942

Inventor
RALPH B. BAKER
By Semmes, Keegin, Beale & Semmes
Attorneys

UNITED STATES PATENT OFFICE 2,303,523

TIRE INTERLINER

Ralph B. Baker, Atlanta, Ga., assignor to Southern Mills, Inc., Atlanta, Ga., a corporation of Georgia Application May 21, 1942, Serial No. 443,991

12 Claims. (Cl. 152—204)

This invention relates to vehicle tires of the pneumatic type and more particularly has reference to protective interliners for insertion between the outer tire casing and the innertube.

Heretofore tire casings were generally discarded when worn to an extent whereby the fabric was exposed or in instances when there were breaks or badly worn spots in the casings. Under present conditions, however, with the supply of tires cut off to the general public, it is desirable to use tire casings until they are completely worn out. The difficulty in this procedure resides in the fact that as a tire becomes badly worn, the danger of blowouts greatly increases. Apart from the dangers and inconveniences of blowouts, there is also the drawback of complete ruination of both the casing and innertube.

It is, of course, possible to utilize the blowout boots and innerliners of the prior art but these tend to reduce the resiliency of a tire and throw the same out of balance, all of which increases the wear on the tire and shortens its life.

In the early days of pneumatic tires, a number of inventions were made on various means for positioning between the casing and the innertube, primarily to prevent puncturing of the innertube by sharp elements penetrating the outer casing. Many of these protective devices were formed of impenetrable materials or of substances which were thick enough to prevent sharp elements from reaching the innertube after having penetrated the outer casing and entered into the protective material. Some of the protective devices for use in the early type of pneumatic tires were formed of pads of raw cotton or other similar fibrous material. Such cotton pads were generally encased in rubber or other envelopes, and in many instances were associated with impenetrable armor. These devices are rather expensive to make and the efficacy for prevention of blowouts when used with badly worn or thin tire casings is quite uncertain.

An object of this invention is to provide an interliner for pneumatic vehicle tires which will enable the use of badly worn tire casings until they are completely worn out.

Another object of this invention is to provide an interliner for pneumatic vehicle tires which will avoid the disadvantages of the prior art as above pointed out.

A further object of this invention is to provide an interliner for pneumatic vehicle tires which is formed of a plurality of assembled cotton slivers.

Still another object of this invention is to provide an interliner for pneumatic vehicle tires formed of a plurality of unwoven cotton slivers transversely stitched together in the form of a compact mat extending circumferentially of the tire.

A still further object of this invention is to provide an interliner for pneumatic vehicle tires formed of a plurality of unwoven cotton slivers transversely stitched together in the form of a compact mat extending circumferentially of the tire in which the slivers extend diagonally of the mat and are provided with binding on the lateral edges thereof to maintain the configuration of the interliner.

With these and other objects in view which will appear more fully hereinafter, the invention comprises the parts and combinations hereinafter disclosed and claimed.

In order to make my invention more clearly understood, I have shown in the accompanying drawing means for carrying the same into practical effect without limiting the improvements in their useful applications to the particular constructions which, for the purpose of explanation, have been made the subject of illustration.

Figure 1:
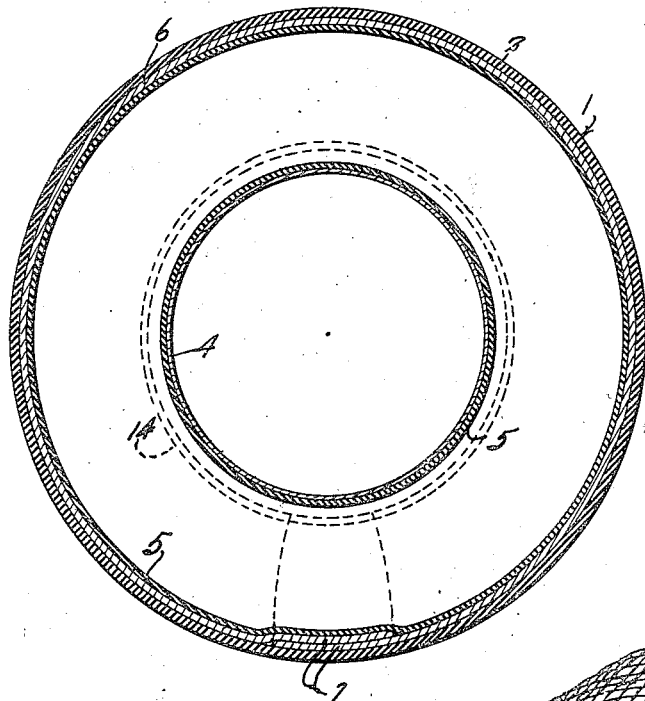
Figure 1 is a longitudinal sectional view of a tire equipped with an interliner in accordance with the present invention.
Figure 2:
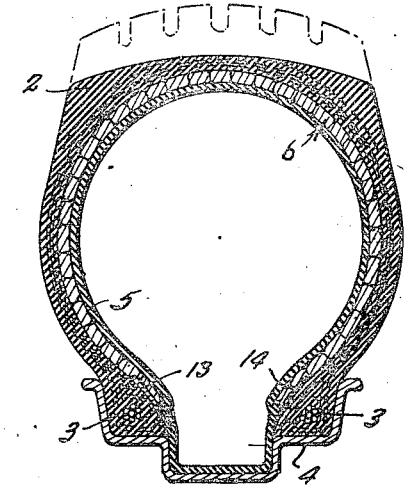
Figure 2 is a transverse sectional view of the tire shown in Figure 1.
Figure 3:
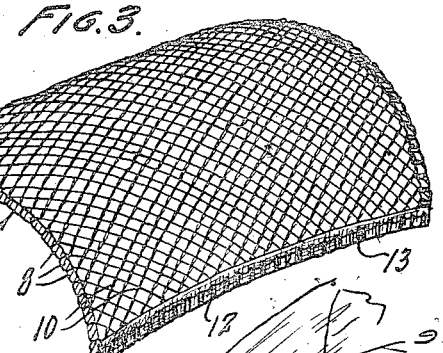
Figure 3 is a fragmentary perspective view of an interliner constructed in accordance with the present invention.

A tire equipped with an interliner constructed in accordance with the present invention is illustrated in Figures 1 and 2 of the drawing. This tire comprises an outer casing 1 having a tread surface 2 and a bead 3 which is adapted to be positioned in the channel of a rim 4 carried by the wheel of a vehicle. The innertube 5 is assembled within the tire in the usual manner and between the innertube and the casing 1 is positioned the interliner 6. As shown in Figures 1 and 2, the interliner is of a width sufficient to cover the outer portion of the innertube and to extend on each side thereof to a position adjacent the bead thereof.

When tires are run partly deflated or entirely "flat", the side walls of the casings are badly damaged and the cotton cords inside the casing often break through the rubber on the inside walls and rub against the innertube.

The interliner of this invention forms a cushion between the defective casing and the innertube and protects the tube.

Also, the interliner of this invention protects the innertube against the ill effects of defective side walls caused by stone bruises.

In Figure 1 of the drawing it will be noted that the interliner has its ends 7 overlapped. While the length of the overlap is immaterial, it is important that there be some overlap or otherwise it may happen that the juncture of the ends 7 of the interliner would coincide with a weak spot in the tire casing and would be more liable to permit a blowout at this portion of the tire.

The interliner forming the subject matter of the present invention is in the form of an elongated strip or mat which extends circumferentially of the tire. Strip 6 is formed of a matting or assembly of cotton slivers 8. The slivers are not twisted and if necessary before knitting may be held intact by helically extending threads 9.

Figure 4:
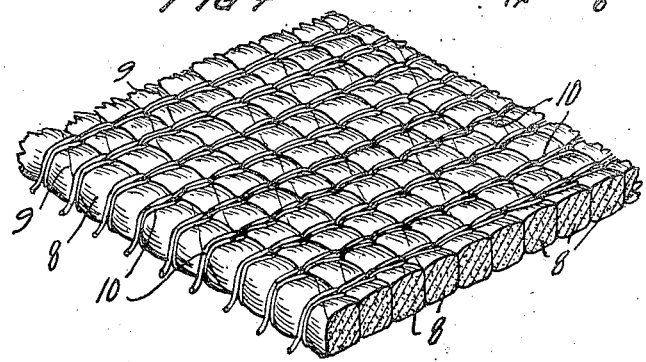
Figure 4 is an enlarged fragmentary detailed view of a portion of the fabric or matting of which the interliner is formed.

In making up the material of which the interliners are formed, a plurality of the slivers 8 are assembled in parallel relation as illustrated in Figure 4. These slivers may consist of a continuous length which is extended back and forth in zig-zag formation, or a plurality of individual slivers may be utilized. In any event, the plurality of assembled parallel slivers are secured together by a plurality of rows of stitching 10. For purposes of the present invention it has been found that a so-called "knit" stitch is very useful for securing the slivers 8 together and for preventing disintegration of the individual slivers. As better illustrated in Figure 5, this knit stitch completely binds each of the slivers and effectively secures together the adjacent bound slivers. In knitting the slivers together, the tightness of the stitching will of course serve to modify the compactness of the composite matting formed.

Figure 5:
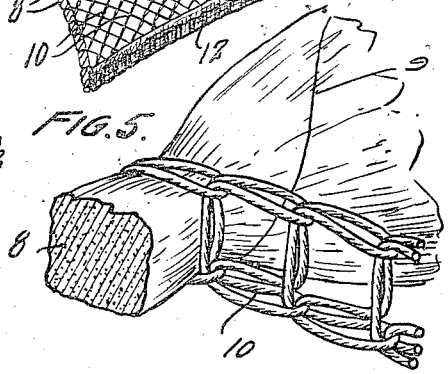
Figure 5 is a fragmentary view illustrating a cotton sliver and the manner in which the same is gripped and secured to adjacent slivers by stitching.
Figure 6:
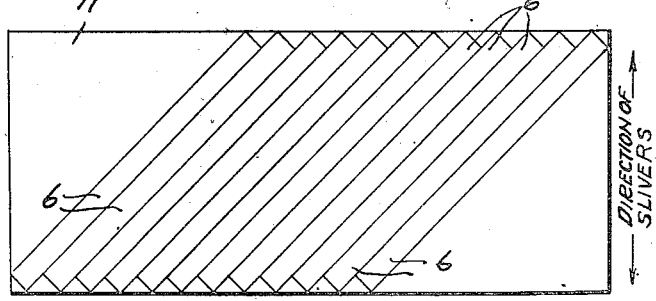
Figure 6 is a plan view of a length of the material or matting of which the interliner is made, illustrating the manner in which such interliners are cut from the length of material.

The fabric or matting 11 formed by knitting together the plurality of lengths of slivers 8 in the manner illustrated in Figures 4 and 5 is formed in large pieces or in the form of a continuous strip having the slivers extending transversely thereof and the stitching extending longitudinally thereof as diagrammatically represented in Figure 6.

In preparing the interliners, a plurality of strips 6 are cut on the bias from the length of fabric or matting 11 as diagrammatically indicated in Figure 6. By cutting the strip 6 on the bias as illustrated, the strip 6 may be more readily made to conform to the contour of the tire without placing an undue strain upon the slivers or the stitches. The strip 6 after being cut from the continuous length of fabric 11 may be molded into an annular form and then the lateral edges 12 thereof may be gathered, to shorten them, and bound by the usual form of edging stitch 13 generally employed for forming selvage edges on fabrics of the type under consideration. By stitching the shortened lateral edges 12, the interliner will retain its annular shape into which it is molded and will better fit in a tire casing in the manner illustrated in Figures 1 and 2.

In order to reinforce the longitudinal edges 12, strips of tape 14 may be secured to said edges by the edging stitches 13.

While it is very desirable that the matting or fabric 11 have the strip 6 cut therefrom on the bias, it is also possible to form the interliner by cutting the fabric in such a manner that the slivers extend either longitudinally or transversely of the strip 6.

While it is preferable to closely knit together the adjacent slivers 8 into a compact matting or fabric, it is also suitable in some instances to form the fabric or matting by somewhat looser stitching. The principal purpose of the present invention is not to prevent puncturing of the innertube by armoring the same against penetration by sharp objects but primarily to prevent portions of the innertube from bulging out through breaks in the outer casing and also to prevent blowing out of the innertube through a weak spot in the tire casing. Consequently even a loosely knitted fabric of slivers will serve effectively in many instances. The rather closely knitted compacted form of fabric, however, has advantages in that the composite fabric has greater strength and will wear for a greater period of time.

Instead of constructing the interliner in the form illustrated in which the ends overlap, it is also within the concept of this invention to construct the interliner as an endless member. In this instance, however, it is necessary to form an interliner for every tire size, whereas in the form illustrated, one liner may be used with several different sizes of tires.

It is also within the concept of this invention to form the interliner of a plurality of pieces of the fabric of slivers knitted together, the pieces of fabric being cut and sewn together to form a perfectly shaped interliner.

The interliner of the present invention is particularly suitable for use with tires in which the tread surface, as indicated in phantom in Figure 2, is worn away to a point in which the fabric of the tire is exposed and even in cases in which holes are worn completely through the casing of the tire. Interliners as herein described may be rather cheaply constructed and are of rather light-weight construction. They will enable tires that normally would be discarded for fear of damage to innertubes by further use to be employed for obtaining increased mileage.

I claim:

1. In combination with a pneumatic tire casing, an interliner comprising a mat of assembled strands of cotton sliver extending circumferentially within the tire casing.

2. In combination with a pneumatic tire casing, an interliner comprising a mat of assembled strands of cotton sliver secured together by stitching extending transversely of the strands, said mat extending circumferentially within the tire casing.

3. An interliner for vehicle tires comprising a circumferentially extending mat of cotton slivers, helically extending threads wrapped about the slivers binding the fibers thereof together, and rows of stitching extending transversely of the slivers for binding the fibers of the slivers together and for securing adjacent slivers together.

4. An interliner for vehicle tires comprising a circumferentially extending mat of cotton slivers, helically extending threads wrapped about the slivers binding the fibers thereof together, and rows of stitching extending transversely of the slivers for binding the fibers of the slivers together and for securing adjacent slivers together, said slivers extending diagonally of the mat, said mat having its lateral edges of less length than the portions between said edges whereby the mat will conform to the shape of the tire.

5. An interliner for vehicle tires comprising a circumferentially extending mat of cotton slivers, helically extending threads wrapped about the slivers binding the fibers thereof together, rows of stitching extending transversely of the slivers for binding the fibers of the slivers together and for securing adjacent slivers together, said slivers extending diagonally of the mat, said mat having its lateral edges of less length than the portions between said edges whereby the mat will conform to the shape of the tire, reinforcing means on said lateral edges, and edging stitching binding said lateral edges and securing the reinforcing means in place.

6. In combination with a pneumatic tire casing, an interliner comprising a mat of strands of cotton sliver, and rows of stitching extending transversely of the strands, binding the fibers of each strand into a unit and securing adjacent strands together, said mat extending circumferentially within the tire casing.

7. In combination with a pneumatic tire casing, an interliner comprising a mat of strands of cotton slivers, means binding the fibers of the strands together, and rows of stitching extending transversely of the strands serving to further bind the fibers of each strand into a unit and securing adjacent strands together, said mat extending circumferentially within the tire casing and being of a width to extend at least half of the circumference of the tire casing in cross section.

8. In combination with a pneumatic tire casing, an interliner comprising a mat of strands of cotton sliver, and rows of threads extending transversely of the strands, each thread having portions knitted upon itself and completely surrounding each strand to bind the fibers thereof into a unit and to bind adjacent strands together, said mat extending circumferentially within the tire casing.

9. In combination with a pneumatic tire casing, an interliner comprising a mat of cotton slivers, and rows of stitching extending transversely of the slivers to bind the fibers of each sliver into a unit and securing adjacent slivers together, said mat extending circumferentially within the tire casing and having its lateral edges lying adjacent the respective beads of the casing, and said edges being of less length than the portions between said edges whereby the mat will conform to the shape of the tire.

10. In combination with a pneumatic tire casing, an interliner comprising a mat of untwisted cotton sliver, rows of stitching extending transversely of the slivers to bind the fibers of each sliver into a unit and securing adjacent slivers together, said mat extending circumferentially within the tire casing and having its lateral edges lying adjacent the respective beads of the casing, said edges being of less length than the portions between said edges whereby the mat will conform to the shape of the tire, and reinforcing means on said lateral edges.

11. An interliner as defined by claim 8 in which the mat is provided with free ends and is assembled within the casing so that the ends lie in overlapping relationship.

12. An interliner as defined in claim 8 in which the ends of the mat are joined to form a circular endless member.

RALPH B. BAKER.